United States Patent [19]

Brunken et al.

[11] Patent Number: 4,809,833
[45] Date of Patent: Mar. 7, 1989

[54] FLUID FRICTION CLUTCH

[75] Inventors: Gerd Brunken, Dittelbrunn; Dieter Neugebauer, Schweinfurt; Peter Rossmanek, Hemmingen, all of Fed. Rep. of Germany

[73] Assignee: Fichtel & Sachs AG, Schweinfurt, Fed. Rep. of Germany

[21] Appl. No.: 15,446

[22] Filed: Feb. 17, 1987

[30] Foreign Application Priority Data

Feb. 20, 1986 [DE] Fed. Rep. of Germany ....... 3605443

[51] Int. Cl.⁴ .............................................. F16D 35/00
[52] U.S. Cl. .............................. 192/58 B; 192/110 B; 192/112; 384/537; 384/905
[58] Field of Search ................ 192/58 R, 58 A, 58 B, 192/58 C, 110 B, 112; 384/493, 557, 905, 537, 584, 585, 903

[56] References Cited

U.S. PATENT DOCUMENTS

| | | | |
|---|---|---|---|
| 2,324,676 | 7/1943 | Butterfield | 384/584 X |
| 2,936,199 | 5/1960 | Kelly | 384/493 |
| 4,213,660 | 7/1980 | Toyota . | |
| 4,218,273 | 8/1980 | Feist et al. | 384/905 X |
| 4,238,016 | 12/1980 | Yoshida et al. | 192/58 B |
| 4,283,096 | 8/1981 | Picard et al. | 384/557 |
| 4,421,216 | 12/1983 | Ellis | 192/58 B |
| 4,473,309 | 9/1984 | Box | 384/905 X |
| 4,662,495 | 5/1987 | Brunken | 192/58 B |
| 4,685,549 | 8/1987 | Brunken et al. | 192/58 B |

FOREIGN PATENT DOCUMENTS

| | | |
|---|---|---|
| 3246783 | 6/1984 | Fed. Rep. of Germany . |
| 545075 | 5/1942 | United Kingdom . |
| 1459129 | 12/1976 | United Kingdom . |
| 1467092 | 3/1977 | United Kingdom . |

*Primary Examiner*—Rodney H. Bonck
*Assistant Examiner*—Richard M. Lorence
*Attorney, Agent, or Firm*—Toren, McGeady & Associates

[57] ABSTRACT

The fluid friction clutch, suitable especially for the cooling fan of an internal combustion engine, has an aluminum housing mounted rotatably by means of a rolling bearing on a drive shaft. The outer race ring of the bearing is seated directly in a tubular bearing extension piece of the aluminum housing. A ring part, held on the bearing extension piece, of a material with lower coefficient of thermal expansion than aluminum, is secured on the bearing extension piece and prevents its widening with rising working temperature.

4 Claims, 2 Drawing Sheets

FLUID FRICTION CLUTCH

BACKGROUND OF THE INVENTION

The invention relates to a fluid friction clutch and especially to a fluid friction clutch for a cooling fan of an internal combustion engine.

A fluid friction clutch for a cooling fan of an internal combustion engine is known from Fed. German patent application No. 3,246,783. The clutch comprises a housing provided with fan blades which, together with a rotor arranged in the housing, forms shear gaps in the usual way for the reception of shear fluid. The housing is rotatably mounted by means of a rolling bearing on a shaft driving the rotor, and has a tubular bearing extension piece protruding into the interior of the housing, in which extension piece the outer race ring of the rolling bearing is held. The bearing extension piece is formed integrally on the housing and provides a cylindrical bearing seating into which the outer race ring is inserted directly.

For reasons of simple production and low weight the housing ordinarily consists of aluminum or an aluminum alloy. In this case however it has appeared that by reason of the temperature fluctuations to which the housing is exposed, bearing play can occur if the bearing extension piece is formed integrally on the housing and thus likewise consists of aluminum or an aluminum alloy. Since aluminum has a higher coefficient of thermal expansion than steel, of which ordinarily the outer race ring of the rolling bearing consists, with increasing working temperature the bearing extension piece expands more, whereby bearing play occurs and the life of the clutch is shortened.

In another context it is known to reinforce the bearing seating of a rolling bearing in an aluminum housing with a steel insert in order to lengthen the life of the bearing. However in these constructions the steel insert always forms the bearing seating for the rolling bearing, which necessitates comparatively expensive production methods if low bearing play is required.

The invention is directed towards providing a way in which a housing, consisting of aluminum or an aluminum alloy, of a fluid friction clutch can be connected with the outer race ring of a rolling bearing which rotatably carries the housing, in a constructionally simple manner, namely so that only relatively slight bearing play occurs even in the case of comparatively great temperature fluctuations.

SUMMARY OF THE INVENTION

The fluid friction clutch proposed within the scope of the invention has a housing with a tubular bearing extension piece protruding into the interior of the housing, in which extension piece there is seated a rolling bearing which carries the housing on a drive shaft. The housing consists, at least in the region of the bearing extension piece, of aluminum or an aluminum alloy. Into the aluminum material of the bearing extension piece there is formed a cylindrical bearing seating into which the outer race ring of the rolling bearing is inserted directly, that is without additional bearing shells or the like. In order to prevent slackening of the outer race ring, ordinarily consisting of steel, of the rolling bearing in the bearing extension piece enclosing the rolling bearing, by reason of the higher coefficient of thermal expansion of aluminum, a ring part of a material the coefficient of thermal expansion of which is lower than th coefficient of thermal expansion of the material of which the bearing extension piece consists is secured to the bearing extension piece. The ring part takes up the temperature stresses and forces which radially widen the bearing extension piece, so that even under high thermal loading the rolling bearing remains fixed in the bearing extension piece. In this way the bearing play can be kept slight and varies, under temperature fluctuations occurring in operation, considerably less than in conventional clutches. Since in this way the bearing is more uniformly loaded and the housing is guided more exactly in relation to the rotor arranged in the housing, the clutch according to the invention has a longer life and a more uniform manner of functioning.

In a preferred embodiment the ring part is formed as a cylindrical clamping ring which is set, preferably pressed, on to the external circumference of the bearing extension piece. The clamping ring does not have to extend over the whole axial height of the outer race ring. It is sufficient if the clamping ring merely encloses the region of the outer race ring axially facing the inside of the housing, since this region is exposed to higher thermal loadings than the region placed further outwards.

In another embodiment the ring part is formed as an annular disc abutting on the end face of the bearing extension piece and connected firmly with the end by axial retaining elements. The axial retaining elements, which may be axially extending screws or rivets, limit not only the radial expansion of the bearing extension piece but also the radial shrinkage of the bearing extension piece at working temperatures which are lower than the temperature at which the clutch was assembled. At low temperatures the annular disc prevents excessive clamping in of the outer race ring of the rolling bearing. The internal diameter of the annular disc is expediently made smaller than the internal diameter of the bearing seating, so that the annular disc can also be exploited for the axial fixing of the outer race ring.

Modern fluid friction clutches when used in internal combustion engines are frequently subjected to very high temperatures. In order that the bearing play may be kept slight even at these high temperatures, it can be expedient to produce the ring part, provided for the temperature stabilization of the bearing extension piece, from a material the coefficient of thermal expansion of which is less than the coefficient of thermal expansion of the material of the outer race ring, that is to say is lower than that of steel.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
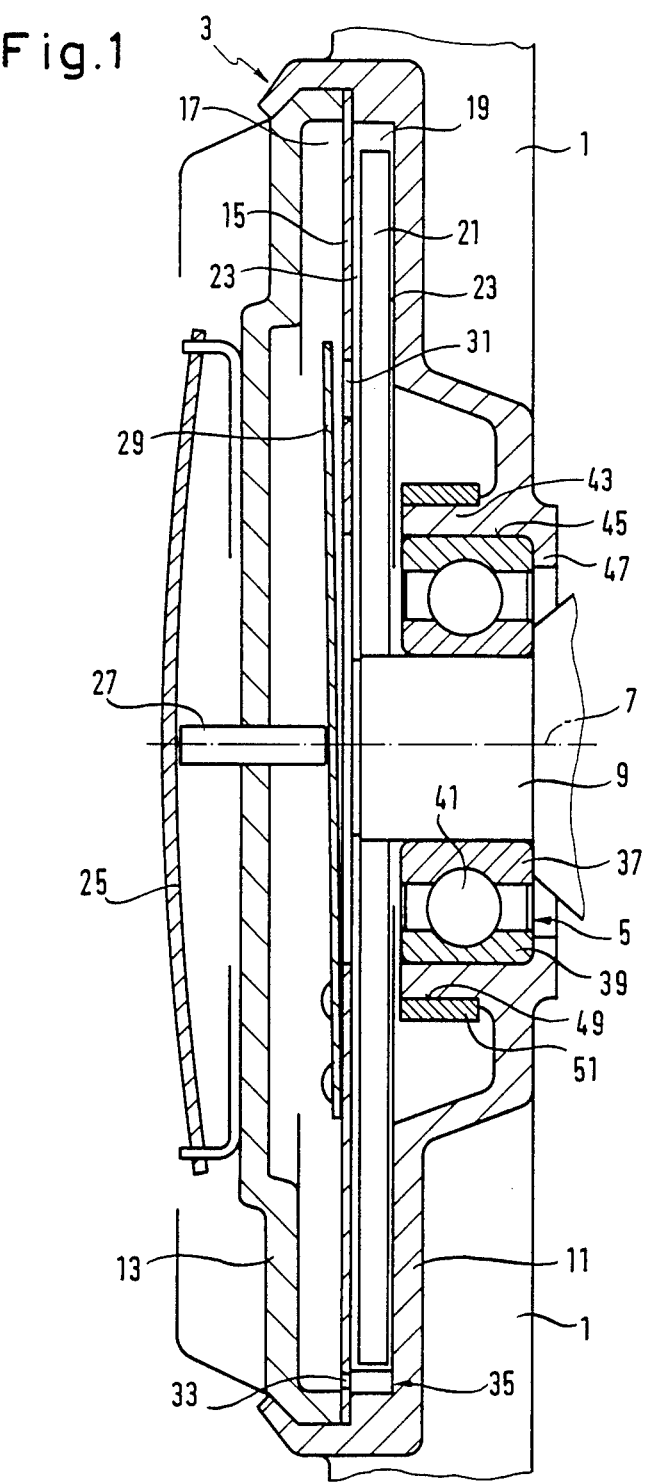
FIG. 1 shows an axial longitudinal section through a fluid friction clutch according to the invention for a cooling fan of an internal combustion engine with a temperature-stabilized housing bearing and FIGS. 2 and 3 show variants of temperature-stabilized housing bearings as usable in a clutch according to FIG. 1.

The fluid friction clutch of a cooling fan of an internal combustion engine as represented in FIG. 1 includes a housing 3 provided with fan blades 1 which is mounted rotatably by means of a rolling bearing 5 on a coaxial shaft 9 rotating about a rotation axis 7 and driven by the internal combustion engine. The housing 3 consists of a substantially pot-shaped housing basic part 11 manufactured, especially cast, from aluminum or an aluminum alloy, which is closed by a cover part 13. The cover part 13 too consists of aluminum or an aluminum alloy. A partition 15 divides the interior space of the housing 3 into a reservoir chamber 17 for shear fluid and a working chamber 19. A rotor 21 substantially of disc form is secured on the shaft 9 extending into the working chamber 19, which rotor 21 can rotate together with the shaft 9 in relation to the housing 3 and forms, with adjacent faces of the housing basic part 11 and the partition 15 seated fast in the housing 3, shear gaps 23 which, when they are filled with shear fluid from the reservoir chamber 17, transmit a torque from the rotor 21 to the housing 3 and thus the fan blades 1. When the shear gaps 23 are emptied of shear fluid the clutch is disengaged and transmits no torque. Since the manner of operation of such a clutch is generally known, it is not to be discussed in further detail.

The clutch is temperature-controllable and includes a bimetallic element 25 arranged on the outer side of the cover part 13 which actuates a valve plate 29 through a central pin axially displaceable in the cover part 13. The valve plate 29 controls a valve opening 31 provided in the partition 15, through which shear fluid can pass from the reservoir chamber 17 into the working chamber 19. The valve opening 31 is provided in the region of a mean diameter of the partition 15. On a larger diameter in the region of the external circumference of the rotor 21 a further opening 33 is provided in the partition 15, by way of which a dynamically acting pump device 35 in the form of a baffle element or the like pumps the shear fluid back from the working chamber 19 into the reservoir chamber 17 by reason of the relative rotation of the housing 3 and the rotor 21. At low working temperatures the bimetallic element 25 closes the valve opening 31, so that no shear fluid can flow out of the reservoir chamber 17 into the working chamber 19 and the pump device 35 pumps the working chamber 19 empty. With rising working temperature the valve opening 31 is opened, so that more shear fluid can flow into the working chamber 19 than is pumped away by the pump device 35. The shear gaps 23 fill with shear fluid, whereby the clutch is engaged.

The rolling bearing 5, which may be a grooved ball bearing as illustrated or equally a cylindrical roller bearing, or a needle bearing or the like, has an inner race ring 37 seated on the shaft 9 and an outer race ring 39 which is guided through balls 41 radially and axially on the inner race ring 37. A tubular bearing extension piece 43 is integrally formed on the housing basic part 11. The bearing extension piece 43 protrudes inwards into the housing 3 and contains an inner, cylindrical bearing seating 45 which is machined into the aluminum material of the housing basic part 11 and into which the outer race ring 39 is inserted, for example pressed, directly, that is without additional bearing shells or the like. An annular collar 47 here serves as aid to assembly.

The bearing extension piece 43 consists of the material of the housing basic part 11, that is of aluminum or an alloy thereof. The outer race ring 39 consists of steel. Since aluminum has a higher coefficient of thermal expansion than steel, the bearing extension piece 43 has the tendency on temperature elevation to widen more than the outer race ring 39. This leads to a slackening of the bearing 5 in the bearing seating 45 and accordingly to an enlargement of the tolerances between the rotor 21 and the surfaces of the housing 3 which form the shear gaps 23. A shortening of the life of the clutch is the consequence. In order to counteract the widening of the bearing extension piece 43, on a cylindrical outer surface 49 of the bearing extension piece 43 there is seated a cylindrical clamping ring 51 of a material the coefficient of thermal expansion of which is less than the coefficient of expansion of the aluminum material of the bearing extension piece 43. The clamping ring 51 limits the widening of the bearing extension piece 43, which increases with rising working temperature, and thus reduces the increase of bearing play with rising temperature. The clamping ring 51 extends in the axial direction only over a part of the axial height of the outer race ring 39, the clamping ring 51 enclosing the bearing extension piece 43 and thus the outer race ring 39 in the thermally more heavily loaded zones facing the housing interior.

The clamping ring 51 prevents slackening of the bearing 5 when the clutch is operationally hot, and guarantees that the bearing play between the balls 41 and the bearing rings 37, 39 is subjected to only slight variations during the heating of the clutch. Thus the life of the rolling bearing is lengthened and its noise generation is reduced. Likewise grinding of the rotor 21 on the housing basic part 11 or the partition 15 by reason of excessively great bearing tolerances is prevented.

Variants of temperature-stabilized bearings such as can be used alternatively with the fluid friction clutch according to FIG. 1 will be explained below. Parts of like effect are designated with the reference numerals of FIG. 1 and provided with a letter for distinction. For more detailed explanation of the construction and manner of operation reference is made to the description of FIG. 1.

Figure 2:
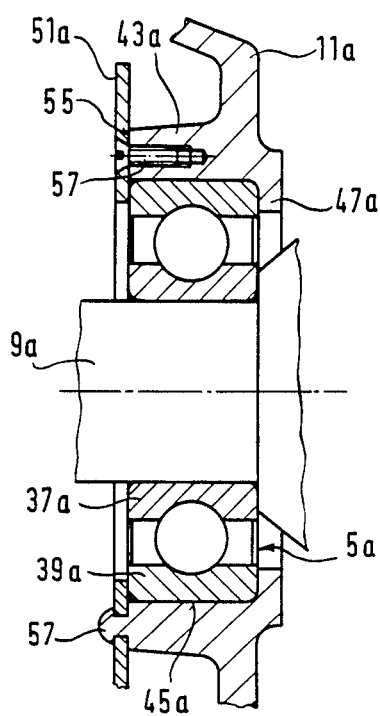

FIG. 2 shows a ball bearing 5a, the inner race ring 37a of which again is seated on the shaft 9a, while its outer race ring 39a is seated directly in a cylindrical bearing seating 45a of the inwardly protruding bearing extension piece 43a, which is integrally formed on the housing basic part 11a. In order to prevent the bearing extension piece 43a, consisting of aluminum or an aluminum alloy, from expanding excessively in relation to the steel outer bearing race ring 39a, with rising working temperature, in place of the clamping ring 51 according to FIG. 1 an annular disc 51a is secured to one end face 55 of the bearing extension piece 43a with a plurality of axial retaining elements 57 arranged in distribution in the circumferential direction. The retaining elements 57 can, as represented in the upper half of FIG. 2, be screws which are screwed in the axial direction into the bearing extension piece 43a. The lower half of FIG. 2 shows an alternative in which rivets protrude axially from the end face 55 of the bearing extension piece 43a and hold the annular disc 51a on the bearing extension piece 43a. The annular disc 51a again consists of a material the coefficient of thermal expansion of which is less than that of the aluminum material of the bearing extension piece 43a, for example of steel.

In distinction from the clutch according to FIG. 1 however the temperature stabilization of the bearing 5a acts not only at temperatures which are higher than the ambient temperature prevailing in the assembly of the clutch, but also at lower temperatures. The retaining elements 57 not only prevent the possibility of the bearing extension piece 43a widening at high working temperatures, but also hinder the bearing extension piece 43a from shrinking at low temperatures. In this way the bearing extension piece 43a is prevented from exerting an increasing pressure upon the outer race ring 39a with decreasing temperature and unacceptably diminishing the bearing play which is necessary within certain tolerances.

The annular disc 51a has an internal diameter which is less than the diameter of the bearing seating 45a so that the outer race ring 39a is axially fixed between the annular disc 51a and the annular collar 47a.

Figure 3:
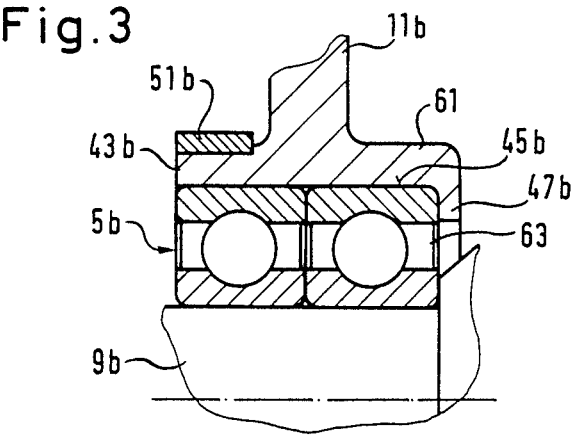

FIG. 3 shows a further variant of a housing bearing which differs from the housing bearing according to FIG. 1 essentially only in that in addition to the inwardly protruding bearing extension piece 43b of the housing basic part 11b an outwardly protruding bearing extension piece 61 is formed on integrally from the aluminum material of the housing basic part 11b. The bearing extension piece 61 forms an outwardly reaching prolongation of the bearing seating 45b and accommodates a second ball bearing 63 in addition to the ball bearing 5b of the inner bearing extension piece 43b. The ball bearing 63, which similarly to the ball bearing 5b is a grooved ball bearing, on the one hand increases the carrying capacity of the bearing mounting and on the other hand reduces the tilting play between the housing basic part 11b and the shaft 9b. In place of the grooved ball bearings 5b, 63 it is also possible for cylindrical roller bearings or needle bearings to be provided. In place of two separate ball bearings one single double-row ball bearing can also be used.

In the case of the housing bearing mounting according to FIG. 3 only the inner bearing extension piece 43b carries a clamping ring 51b in order to take account of the thermal loading of the two ball bearings 5b, 63, which in most cases is unequal. While the ball bearing 5b is intensely heated from the interior, the outer ball bearing 63 is subjected to lower temperatures. The bearing seating 45b therefore has the tendency to assume a non-cylindrical form which would lead to an unequal loading of the ball bearings 5b, 63. Due to the unilateral arrangement of the clamping ring 51b a uniform loading of the two ball bearings 5b, 63 and a reduction of the tilting play between the shaft 9b and the housing basic part 11b can be achieved.

The two ball bearings 5b and 63 are seated with press fit in the common cylindrical bearing seating 45b. The annular collar 47b which facilitates assembly is however provided in this case on the outer bearing extension piece 61.

In the housing bearing mountings as explained with reference to FIGS. 1 to 3 the clamping rings 51 and 51b and the annular disc 51a consist of the material of the outer race ring of the ball bearings, that is of steel. However alternatively the clamping rings 51, 51b and the annular disc 51a can be produced from a material which has a lower coefficient of thermal expansion than the material of the outer race ring of the ball bearings, that is a lower coefficient of thermal expansion than steel. This dimensioning is advantageous especially when in operation the outer race rings of the rolling bearings reach a distinctly higher temperature than the inner race rings of the rolling bearings. In such an operational condition the bearing play of the rolling bearing would increase, which is disadvantageous for the operation of the clutch. The rise of the bearing play is compensated by the use of temperature-stabilizing rings with a coefficient of thermal expansion lower than that of steel.

While specific embodiments of the invention have been shown and described in detail to illustrate the application of the inventive principles, it will be understood that the invention may be embodied otherwise without departing from such principles.

What we claim is:

1. A fluid friction clutch comprising
   (a) a shaft (9) driveable in rotation about a rotation axis (7),
   (b) a rolling bearing (5) having an inner race ring (37) seated on the shaft (9), an outer race ring (39) and a plurality of rolling bodies (41) which guide the outer race ring rotatably on the inner race ring,
   (c) a housing (3) rotatable coaxially in relation to the shaft (9) having an axially extending tubular bearing extension piece (43) extending around the rotation axis and protruding into the interior of the housing (3) which bearing piece forms an axially extending inner cylindrical bearing seat (45) into which the outer race ring (39) is inserted in direct bearing contact with said seat, said extension piece having an axially extending cylindrical outer seating surface (49) on the exterior of the extension piece and enclosing the inner bearing seat (45), at least the region of the bearing extension piece (43) of the housing (3) comprises one of aluminum and a aluminum alloy,
   (d) a rotor (21) firmly connected with the shaft (9) in the housing (3), which rotor with the housing forms at least one shear gap (23) for the reception of shear fluid, and
   (e) an axially extending cylindrical clamping ring (51) extending in the axial direction for at least a major portion of the axial length of and seated with a pressed fit in contact with the cylindrical outer seating surface (49) of the bearing extension piece (43) and formed of a metal the coefficient of thermal expansion of which is lower than the coefficient of thermal expansion of the one of aluminum and aluminum alloys which form the region of the bearing extension piece (43), the clamping ring, (51) being secured to the bearing extension piece (43) in such a way that it takes up forces radially expanding the bearing extension piece.

2. A fluid friction clutch according to claim 1, wherein the clamping ring has a smaller axial dimension than the corresponding dimension of said outer race ring of the rolling bearing and encloses the region of the outer race ring extending axially into the inside of the housing.

3. A fluid friction clutch according to claim 1, wherein the coefficient of thermal expansion of the clamping ring is less than the coefficient of thermal expansion of the material of the outer race ring.

4. A fluid friction clutch according to claim 3, wherein the coefficient of thermal expansion of the clamping ring is smaller than the coefficient of thermal expansion of steel.

* * * * *